United States Patent
Subramaniam

(10) Patent No.: US 11,916,704 B2
(45) Date of Patent: Feb. 27, 2024

(54) PRE-EQUALIZER AT THE TERMINAL TO COMPENSATE FOR FORWARD LINK DISTORTIONS

(71) Applicant: Hughes Network Systems, LLC, Germantown, MD (US)

(72) Inventor: Bala Subramaniam, Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 17/726,730

(22) Filed: Apr. 22, 2022

(65) Prior Publication Data

US 2022/0376959 A1 Nov. 24, 2022

Related U.S. Application Data

(60) Provisional application No. 63/190,320, filed on May 19, 2021.

(51) Int. Cl.
*H04L 25/03* (2006.01)
(52) U.S. Cl.
CPC .. *H04L 25/03343* (2013.01); *H04L 25/03159* (2013.01); *H04L 2025/0349* (2013.01)
(58) Field of Classification Search
CPC ....... H04L 25/03159; H04L 2025/0349; H04L 1/0045; H04L 25/03343

(Continued)

(56) References Cited

U.S. PATENT DOCUMENTS

| 6,044,107 A * | 3/2000 | Gatherer | H04M 11/062 |
| | | | 375/222 |
| 2006/0026659 A1* | 2/2006 | McMullin | H04N 21/6168 |
| | | | 725/111 |

(Continued)

FOREIGN PATENT DOCUMENTS

| JP | 2016 059026 A | 4/2016 |
| JP | 2016059026 | * 4/2016 |
| KR | 960010495 | * 8/1996 |

OTHER PUBLICATIONS

International Search Report and Written Opinion for PCT/US2022/028668 dated Aug. 23, 2022, all pages.

(Continued)

*Primary Examiner* — Leila Malek
(74) *Attorney, Agent, or Firm* — Kilpatrick Townsend & Stockton LLP

(57) ABSTRACT

Techniques are described for pre-equalization at the demodulator of a satellite receiver terminal to compensate for forward link distortions. Some satellite channel filters can manifest distortions, such as asymmetric group delay response. Such distortions can conventionally force restriction of symbol rate only to the portion of the channel bandwidth having a symmetric filter response. Embodiments include a pre-equalizer in the demodulation path that filters received downlink communications based on a set of pre-equalizer filter coefficients computed to at least partially compensate for the channel filter distortions. Some embodiments support updating the filter coefficients based on channel reassignments, and/or dynamically updating the filter coefficients based on detecting and exploiting pre-equalization frames. The pre-equalized sample stream can facilitate reliable decoding by the demodulator with an appreciably increased symbol rate and correspondingly increased forward link capacity.

15 Claims, 9 Drawing Sheets

(58) Field of Classification Search
USPC ........................................................ 375/262
See application file for complete search history.

(56) References Cited

U.S. PATENT DOCUMENTS

2009/0282431 A1* 11/2009 Bushner ........... H04N 21/42684
725/68
2013/0315346 A1* 11/2013 Varma ..................... H04H 40/90
375/316

OTHER PUBLICATIONS

Kojima Masaaki et al., "Study on equalization system using transponder characteristics to compensate for non-linear distortion," 2016 IEEE Radio and Wireless Symposium (RWS), IEEE, Jan. 24, 2016, pp. 13-15, XP032888108, DOI: 10.1109/RWS.2016.7444350 [retrieved on Mar. 30, 2016].

* cited by examiner

PRE-EQUALIZER AT THE TERMINAL TO COMPENSATE FOR FORWARD LINK DISTORTIONS

CROSS-REFERENCES TO RELATED APPLICATIONS

This Application is non-provisional of, and claims the benefit of priority from, U.S. Patent Application No. 63/190,320, filed May 19, 2021, entitled "PRE-EQUALIZER AT THE TERMINAL TO COMPENSATE FOR FORWARD LINK DISTORTIONS," the disclosure of which is hereby incorporated by reference in its entirety for all purposes.

BACKGROUND

Some modern communication satellite designs are seeking ever-increasing throughput, while minimizing the impact to the size and weight of the satellite payload. For example, increasing the number of beams can increase throughput, which can increase the number of terminals that can be supported by the satellite. Increasing the power to those beams can increase signal-to-noise ratio (SNR), or signal-to-interference-noise ratio (SINR), can further increase throughput, such as by permitting usage of more efficient coding and modulation schemes. More beams and higher power can tend to involve more components and larger components. However, communication satellite designs typically must meet strict payload and operating constraints, such as strict maximum weight and power limits. Conventionally, satellite designs represent a balance between increased throughput and reduced weight and power.

To continue increasing throughput while continuing to meet weight and power constraints, some modern designs are beginning to use solid-state (e.g., gallium-arsenide, etc.) components and architectures for implementing amplifiers, filters, and other components on the satellite. Such components tend to be considerably smaller and lighter than their conventional counterparts. However, such components can also tend to cause certain forward-link distortions. Linear impairments, such as phase (e.g., group delay) and amplitude distortions are caused by filters in the gateway, satellite, and terminals. In the satellite channel, the frequency response is dominated by the input multiplexer (IMUX) and output multiplexer (OMUX) filters on board the satellite payload. Use of solid-state filter components in the IMUX and OMUX filters can tend to yield an asymmetric satellite filter group delay response with large in-band slope. The group delay distortion can limit throughput, such as by limiting symbol throughput only to the symmetric region of the filter.

SUMMARY

Embodiments include systems and methods for pre-equalization at the demodulator of a satellite receiver terminal to compensate for forward link distortions. Some satellite channel filters can manifest distortions, such as asymmetric group delay response. Such distortions can conventionally force restriction of symbol rate only to the portion of the channel bandwidth having a symmetric filter response. Embodiments include a pre-equalizer in the demodulation path that filters received downlink communications based on a set of pre-equalizer filter coefficients computed to at least partially compensate for the channel filter distortions. Some embodiments support updating the filter coefficients based on channel reassignments, and/or dynamically updating the filter coefficients based on detecting and exploiting pre-equalization frames. The pre-equalized sample stream can facilitate reliable decoding by the demodulator with an appreciably increased symbol rate and correspondingly increased forward link capacity.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
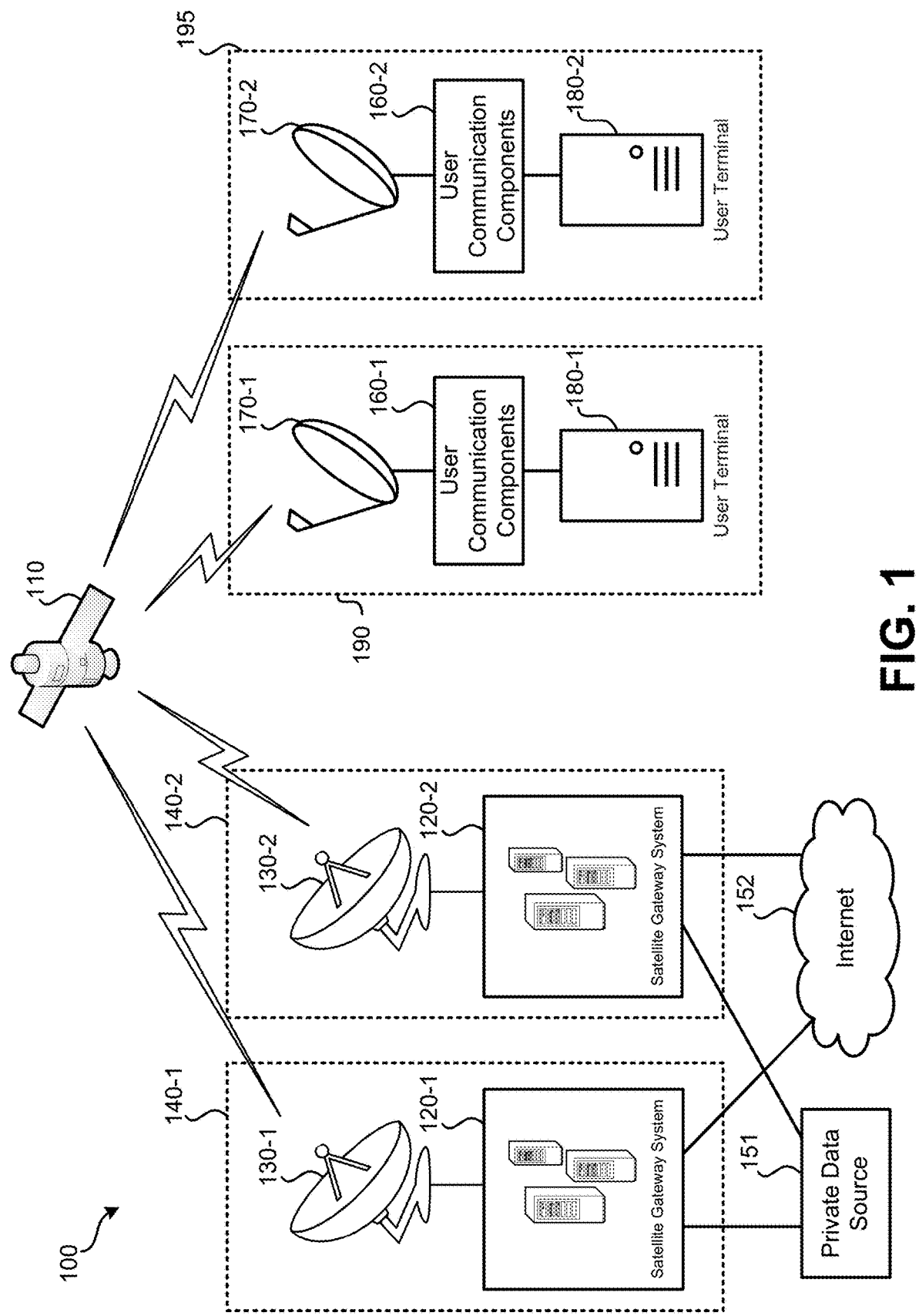
FIG. 1 illustrates an embodiment of a bidirectional satellite communication system.

Designs of high-throughput communication satellites typically seek to maximize throughput within strict payload and operational constraints (e.g., size, weight, power, etc.). For example, throughput can be increased by increasing the number of beams supported by a satellite and by increasing the power provided to those beams. However, increasing the number of beams and/or the power to the beams tends to involve more components and/or larger components, which tends to increase size, weight, power, and/or other payload characteristics. Some modern communication satellite designs have begun using solid-state (e.g., gallium-arsenide, etc.) components and architectures to implementing amplifiers, filters, and other components on the satellite. Such components tend to be considerably smaller and lighter than their conventional counterparts, such that throughput can be increased with a reduced impact to payload and operational constraints. However, it has been found that some such solid-state approaches tend to cause certain forward-link distortions, such as asymmetric satellite filter group delay response with large in-band slope.

As described below, terminals generally receive forward-link communications from a satellite via a spot beam. Various components in the receive path of the terminal, such as a bit timing recovery (BTR) block, seek to recover a communicated bit stream from the forward-link communications. If there is excessive forward-link distortion, the BTR block can fail to establish and/or maintain lock on the signal, and the bit stream cannot be recovered. Thus, in the case of asymmetric satellite filter response (e.g., asymmetric satellite filter group delay response), bitrates of forward-link communications may be restricted only to the symmetric region of the satellite filters to ensure reliable bit stream recovery by receiving terminals (i.e., the region in which the BTR can reliably establish and maintain lock). As such, asymmetric satellite filter response can tend to limit symbol rate, thereby limiting throughput.

Embodiments described herein include a novel pre-equalization block in the receive path of terminals to compensate for forward-link satellite filter distortions in a high-throughput satellite communication system. The pre-equalization block is place ahead of the BTR block, equalizer block, and other blocks of the terminal receive path. Satellite filter response characteristics can be maintained for each beam (e.g., possibly hundreds of beams) of the satellite. When a terminal initializes communications with a satellite spot beam, the pre-equalization block can be loaded with filter coefficients that correspond to an inverse of the satellite filter response characteristics for that beam. The pre-equalization block can thus filter the forward link signal received via the beam to compensate for the specific satellite filter response characteristics associated with that beam, providing a more symmetric forward-link signal to the downstream terminal receive components. Some embodiments of the pre-equalization block also include dynamic adaptation of the filter coefficients over time.

Further detail regarding these concepts is provided in relation to the figures. FIG. 1 illustrates an embodiment of a bidirectional satellite communication system 100 as a context for embodiments described herein. Bidirectional satellite communication system 100 may include: relay satellite 110; satellite gateway systems 120; bidirectional satellite communication links 130; private data source 151; user communication components 160; satellite antennas 170; and user terminals 180. Relay satellite 110 may be a bidirectional communication satellite that relays communications between satellite gateway systems 120 and user communication components 160. Therefore, via relay satellite 110, data may be transmitted from satellite gateway systems 120 to user communication components 160 and data may be transmitted from user communication components 160 to satellite gateway systems 120. Embodiments described herein focus on forward-link communications from the satellite gateway systems 120 to the user communication components 160 via the relay satellite 110. More specifically, embodiments described herein primarily focus on the downlink portion of the forward-link from the relay satellite 110 to the user communication components 160.

In some embodiments, system 100 may be used to provide user communication components 160 with Internet access, and/or access to any other suitable public and/or private networks. Additionally or alternatively, system 100 may be used to provide user communication components 160 with access to private data source 151, which may be a private network, data source, or server system. In some architectures, satellite gateway systems 120 are in communication with backhaul infrastructure, terrestrial networks, and/or other communications infrastructure.

Relay satellite 110 may use different frequencies for communication with satellite gateway systems 120 than for communication with user communication components 160. Further, different frequencies may be used for uplink communications than for downlink communications. For example, different frequency bands, sub-bands, etc. can be used for some or all of forward uplink communications (satellite gateway system 120 to relay satellite 110), forward downlink communications (relay satellite 110 to user communication components 160), return uplink communications (user communication components 160 to relay satellite 110), and return downlink communications (relay satellite 110 to satellite gateway system 120).

Each satellite gateway system 120 is located at a respective geographic location 140. For example, satellite gateway system 120-1 communicates with relay satellite 110 using bidirectional satellite communication link 130-1, which can include one or more high-gain antennas that allow high data transmission rates between satellite gateway system 120-1 and relay satellite 110. Satellite gateway system 120-1 may receive data from and transmit data to many instances of user equipment, such as user communication components 160. Satellite gateway system 120-1 may encode data into a proper format for relaying by relay satellite 110. Similarly, satellite gateway system 120-1 may decode data received from various instances of user communication components 160 received via relay satellite 110.

Satellite gateway system 120-1 may serve as an intermediary between the satellite communication system and other data sources, such as private data source 151 and Internet 152. Satellite gateway system 121 may receive requests from user communication components 160 via relay satellite 110 for data accessible using Internet 152. Satellite gateway system 120-1 may retrieve such data from Internet 152 and transmit the retrieved data to the requesting instance of user equipment via relay satellite 110. Additionally or alternatively, satellite gateway system 120-1 may receive requests from user communication components 160 via relay satellite 110 for data accessible in private data source 151. Satellite gateway system 120-1 may retrieve such data from private data source 151 and transmit the retrieved data to the requesting instance of user equipment via relay satellite 110.

Satellite gateway system 120-2 may function similarly to satellite gateway system 120-1, but may be located in a different physical location. While satellite gateway system 120-1 is located at geographic location 140-1, satellite gateway system 120-2 is located at geographic location 140-2. Co-located with satellite gateway system 120-2 may be bidirectional satellite communication link 130-2. Satellite gateway system 120-2 and bidirectional satellite communication link 130-2 may service a first group of user equipment while satellite gateway system 120-1 and bidirectional satellite communication link 130-1 may service another set of user equipment. Satellite gateway system 120-2 and bidirectional satellite communication link 130-2 may function similarly to satellite gateway system 120-1 and bidirectional satellite communication link 130-1 respectively.

Embodiments can use various techniques to mitigate interference between gateway systems 120. Some embodiments mitigate interference by geographic diversity. For example, geographic locations 140-1 and 140-2 may be separated by a significant enough distance such that the same frequencies can be used for uplink and downlink communications between bidirectional satellite communication links 130 and relay satellite 110 without a significant amount of interference occurring. Other embodiments use frequency diversity (e.g., multiple colors, such as different frequency bands or sub-bands) between adjacent gateway systems 120. Other embodiments use temporal diversity (e.g., different communication timing) between adjacent gateway systems 120.

While two instances of satellite gateway systems 120 and bidirectional satellite communication links 130 are illustrated as part of system 100, it should be understood that in some embodiments only a single satellite gateway system and a single bidirectional satellite communication link system are present or a greater number of satellite gateway systems 120 and bidirectional satellite communication links 130 are present. For example, for a satellite-based Internet service provider, four to eight (or significantly more) satellite gateway systems 120 and associated bidirectional satellite communication links 130 may be scattered geographically throughout a large region, such as North America.

User communication components 160, along with user terminals 180 and satellite antennas 170 (which can collectively be referred to as "user equipment") may be located in a fixed geographic location or may be mobile. For example, user communication components 160-1, satellite antenna 170-1, and user terminal 180-1 may be located at a residence of a subscriber that has a service contract with the operator of satellite gateway systems 120. The term "user" is intended only to distinguish from the gateway side of the network 100. For example, user terminal 180 can be associated with an individual subscriber to satellite communication services, with a corporate or other entity user, with a robotic user, with an employee of the satellite communication services provider, etc.

User communication components 160-1, satellite antenna 170-1, and user terminal 180-1 may be located at a fixed location 190. Fixed location 190 may be a residence, a building, an office, a worksite, or any other fixed location at which access to Internet 152 and/or private data source 151 is desired. User communication components 160-2, satellite antenna 170-2, and user terminal 180-2 may be mobile. For instance, such equipment may be present in an airplane, ship, vehicle, or temporary installation. Such equipment may be present at geographic location 195; however, geographic location 195 may change frequently or constantly, such as if the airplane, ship, or vehicle is in motion.

Satellite antenna 170-1 may be a small dish antenna, approximately 50 to 100 centimeters in diameter. Satellite antenna 170-1 may be mounted in a location that is pointed towards relay satellite 110, which may be in a geosynchronous orbit around the earth (i.e., the relay satellite 110 is a geosynchronous, or GEO, satellite). As such, the direction in which satellite antenna 170-1 is to be pointed stays constant. In some embodiments, low Earth orbit (LEO) and medium Earth orbit (MEO) satellites may be used in place of a geosynchronous satellite in the system. In some embodiments, relay satellite 110 is a high-throughput multi-beam satellite that communicates with user terminals using multiple (e.g., hundreds of) spot beams. In case of a multi-beam GEO satellite, for example, each of the multiple spot beams illuminates a respective coverage area. A fixed-location user terminal 180 can communicate with the relay satellite 110 generally via a particular one of the spot beams, unless there is some reason to reassign the user terminal 180 (e.g., in case of a gateway system 120 outage). Communications with mobile user terminals 180 can be handed off between spot beams as the mobile user terminal 180 moves through different coverage areas. In the case of non-GEO (e.g., MEO or LEO) relay satellites 110, spot beam coverage areas typically trace a path across the surface of the Earth with changes in the satellite's position relative to the Earth.

User communication component 160-1 refers to the hardware necessary to translate signals received from relay satellite 110 via satellite antenna 170-1 into a format which user terminal 180-1 can decode. Similarly, user communication components 160-1 may encode data received from user terminal 180-1 into a format for transmission via satellite antenna 170-1 to relay satellite 110. User communication components 160-1 may include a satellite communication modem. This modem may be connected with or may have incorporated a wired or wireless router to allow communication with one or more user terminals. In system 100, a single user terminal, user terminal 180-1, is shown in communication with user communication components 160-1. It should be understood that, in other embodiments, multiple user terminals may be in communication with user communication components 160-1. User terminal 180-1 may be various forms of computerized devices, such as: a desktop computer; a laptop computer; a smart phone; a gaming system or device; a tablet computer; a music player; a smart home device; a smart sensor unit; Voice over IP (VoIP) device, or some other form of computerized device that can access Internet 152 and/or private data source 151. Since user communication components 160 and a satellite antenna 170 can continue communicating with a satellite gateway system even if a user terminal 180 is not currently communicating with user communication components 160-1, it should be understood that some instances of user equipment may not include a user terminal 180.

Despite being in motion or in a temporary location, user communication components 160-2, satellite antenna 170-2, and user terminal 180-2 may function similarly to user communication components 160-1, satellite antenna 170-1, and user terminal 180-1. In some instances, satellite antenna 170-2 may either physically or electronically point its antenna beam pattern at relay satellite 110. For instance, as a flight path of an airplane changes, satellite antenna 170-2 may need to be aimed in order to receive data from and transmit data to relay satellite 110. As discussed in relation to user terminal 180-1, only a single user terminal, user terminal 180-2, is illustrated as in communication with user communication components 160-2 as part of system 100. It should be understood that in other embodiments, multiple user terminals may be in communication with user communication components 160-2. For example, if such equipment is located on an airplane, many passengers may have computerized devices, such as laptop computers and smart phones, which are communicating with user communication components 160-2 for access to Internet 152 and/or private data source 151. As detailed in relation user terminal 180-1, user terminal 180-2 may be various forms of computerized devices, such as those previously listed.

While FIG. 1 illustrates only two instances of user communication components 160, two instances of satellite antennas 170, and two instances of user terminals 180, system 100 may involve any suitable number (e.g., hundreds or thousands) of instances of satellite antennas, user equipment, and user terminals distributed across various geographic locations. Some number of these instances may be in relatively fixed locations, while others of these instances may have periodically or constantly changing locations (e.g., mobile terminals, or aero terminals for providing Internet service in aircraft, or the like). Further, while only a single relay satellite 110 is shown, some architectures include multiple satellites, such as cooperating satellites in a constellation, multiple satellites with overlapping coverage areas, etc.

Figure 2:
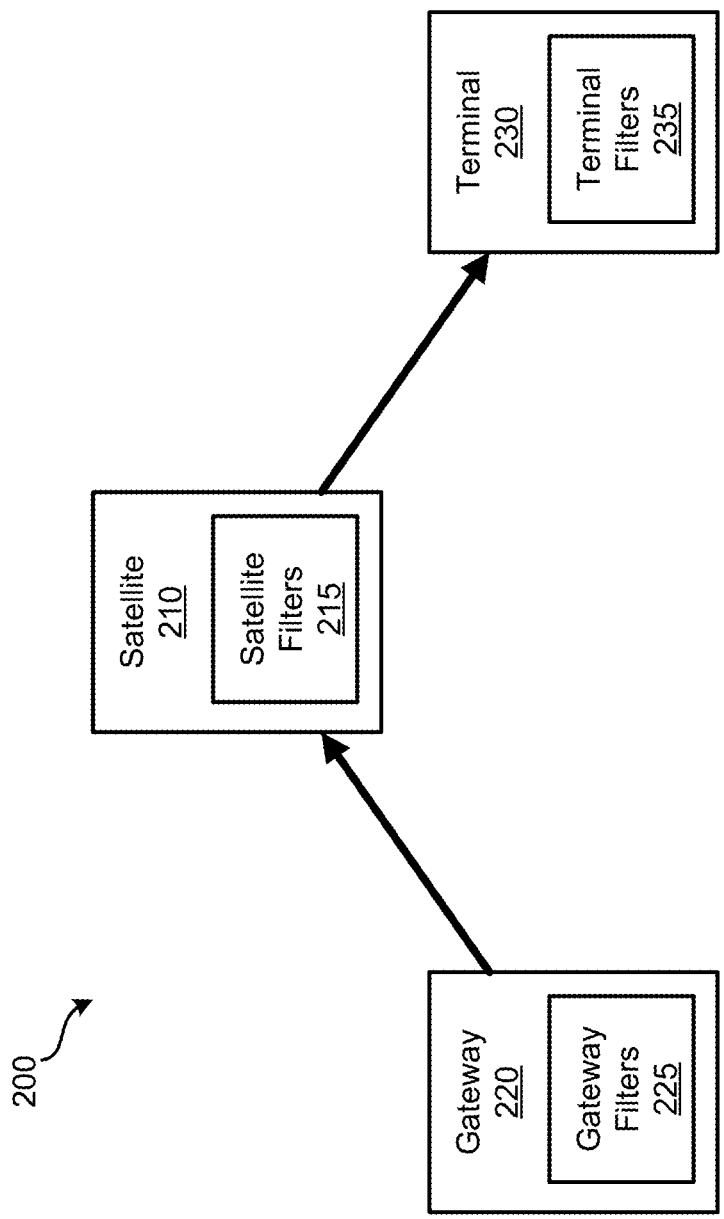
FIG. 2 illustrates a simplified satellite communication network as further context for embodiments.

Except as otherwise indicated, the remainder of the description references a simplified satellite communication network convention. Consistent with such a convention, FIG. 2 illustrates a simplified satellite communication network 200 as further context for embodiments. The simplified satellite communication network enables satellite communications between a "gateway" 220 and a "terminal" 230 via a "satellite" 210. According to this convention, the term "gateway" 220 generally includes any gateway of any suitable number of gateways in the network, for example, including the associated satellite gateway system 120 and bidirectional satellite communication link 130 of FIG. 1. According to this convention, the term "terminal" 230 generally includes any terminal of any suitable number of terminals in the network, for example, including the associated user terminal 180, user communication components 160, and satellite antenna 170 of FIG. 1. According to this convention, the term "satellite" 210 refers to any satellite of any suitable number of satellites in the network.

The simplified network particularly shows the "forward link" satellite communication channel as supporting forward-link communication from the gateway 220 to the terminal 230 via the satellite 210. Various linear impairments are present on the forward link, such as group delay and amplitude distortion. These distortions can be caused by filters and/or other components across the channel. For example, as illustrated, the gateway 220 includes gateway filters 225, the satellite 210 includes satellite filters 215, and the terminal 230 includes terminal filters 235; and all of these filters have particular filter characteristics. Further, different types of filters can be present in different implementations and architectures. For example, the terminal 230 can includes an outdoor unit (ODU) with ODU filters, an indoor unit (IDU) with IDU filters (e.g., tuner filters), and an interfacility link (IFL) that couples the ODU with the IDU.

In the satellite 210 channel, the frequency response tends to be dominated by input multiplexing (IMUX) and output multiplexing (OMUX) filters on board the payload (i.e., the satellite 210). In high-throughput satellites, the satellite filters 215 are typically implemented using solid state technologies to reduce weight. It has been discovered that, at least in some such solid-state implementations, the satellite filters 215 tend to manifest imperfect magnitude responses and group delay responses, and the group delay response tends to be asymmetric with large in-band slope. These imperfect response characteristics can contribute group delay distortion, which can limit symbol throughput by only using the symmetric region of the filter. For example, such distortions can result in inter-symbol interference (ISI), and the like.

Figure 3A:
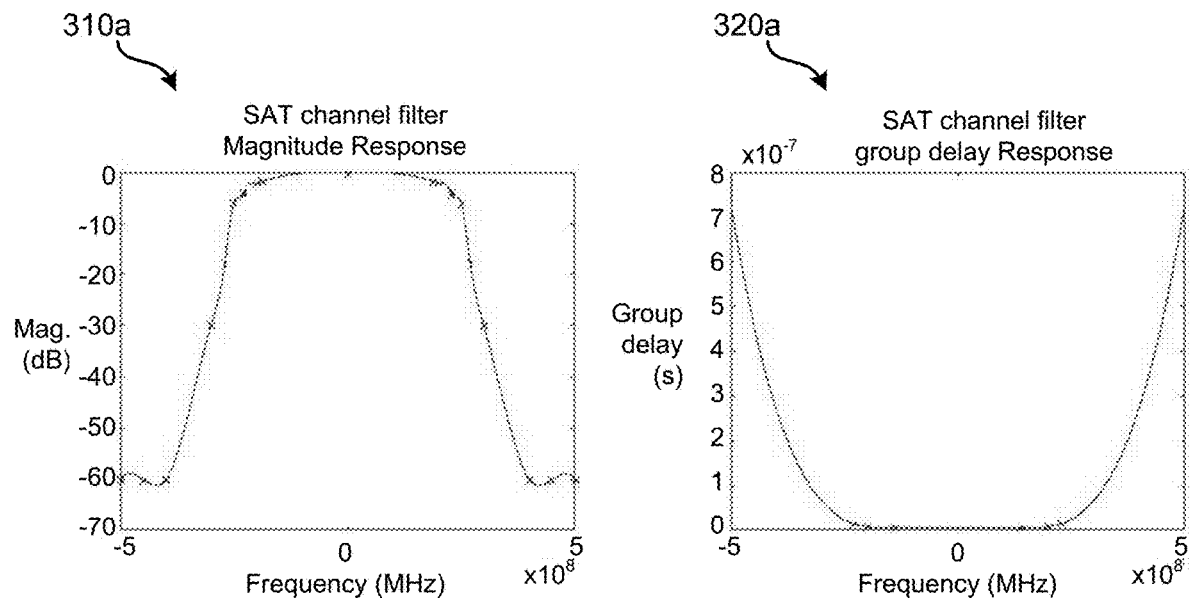
FIGS. 3A and 3B show illustrative symmetric and asymmetric satellite channel filter response plots, respectively.
Figure 3B:
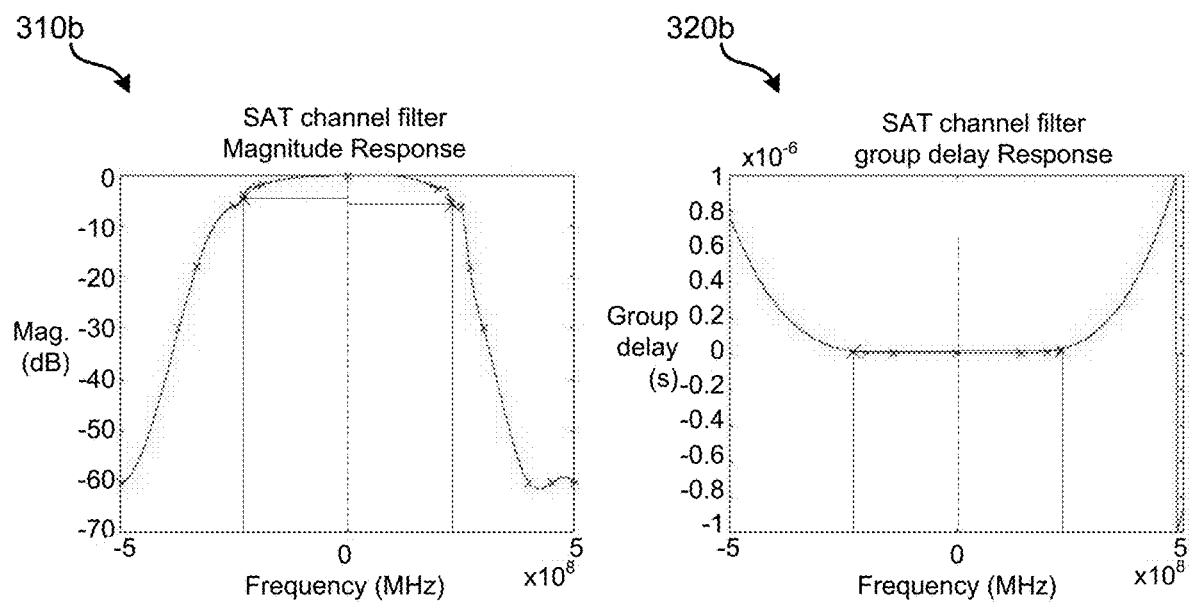

For the sake of illustration, FIGS. 3A and 3B show illustrative satellite channel filter response plots. Each shows an illustrative satellite channel filter magnitude response plot 310 and a satellite channel filter group delay response plot 320 for illustrative 500-Megahertz (MHz) passband filters (e.g., the usable portion of the signal, or the −3 dB point, is approximately 250 MHz on either side of the center frequency). FIG. 3A illustrates a substantially symmetric satellite channel response. For example, an amount of magnitude and phase distortion introduced by the filter on a portion of a symbol transmitted at X Mhz above the center frequency (e.g., where the response magnitude has dropped off by 3 dB to the positive side of the center frequency) will be substantially identical to the amount of magnitude and phase distortion introduced by the filter on a portion of the symbol transmitted at X Mhz below the center frequency (e.g., where the response magnitude has dropped off by 3 dB to the negative side of the center frequency). Such a substantially symmetric response tends to be characteristic of many conventional architectures and enables the receive path of a receiving terminal to achieve and maintain lock for reliable symbol recovery.

In contrast, FIG. 3B illustrates a substantially asymmetric satellite channel response with a large in-band slope. For the sake of added clarity, in each of the magnitude response plot 310b and the group delay response plot 320b, visual guides are provided to indicate an illustrative response at 235 MHz below the center frequency and 235 MHz above the center frequency. It can be seen that the magnitude and phase (group delay) responses are asymmetric: the responses at 235 MHz below the center frequency are different from those at 235 MHz above the center frequency. Such an asymmetric response tends to be characteristic of some solid-state satellite channel filters being used in some newer high-throughput satellites (e.g., satellites with capacity of at least 300 Gbps), such as to help meet size, weight, power, and/or other payload design constraints.

These asymmetries can prevent receiving terminals from reliably achieving and maintaining lock for symbol recovery for frequencies falling in the asymmetric regions of the filter response. Some conventional approaches restrict the bitrate of forward downlink communications to the symmetric portion of the satellite channel filter. For example, the satellite channel filter represented by the response plots of FIG. 3B may have a sufficiently symmetric response within 100 or 200 MHz of the center frequency. However, restricting a 500-MHz channel filter to operation only within, say, 400 MHz (or a symbol rate of approximately 400 Msps) can effectively reduce the bandwidth of that channel by 20 percent. Further, such a reduction is per beam. Such a reduction in channel bandwidth and corresponding throughput is antithetical to any high-throughput satellite design. Embodiments described herein can support increased symbol rates, such as around 476 Msps. An increase of 76 Msps over a large number of beams can yield an appreciable increase in bandwidth (e.g., more than 22 Gbps of additional bandwidth over 300 beams).

Figure 4:
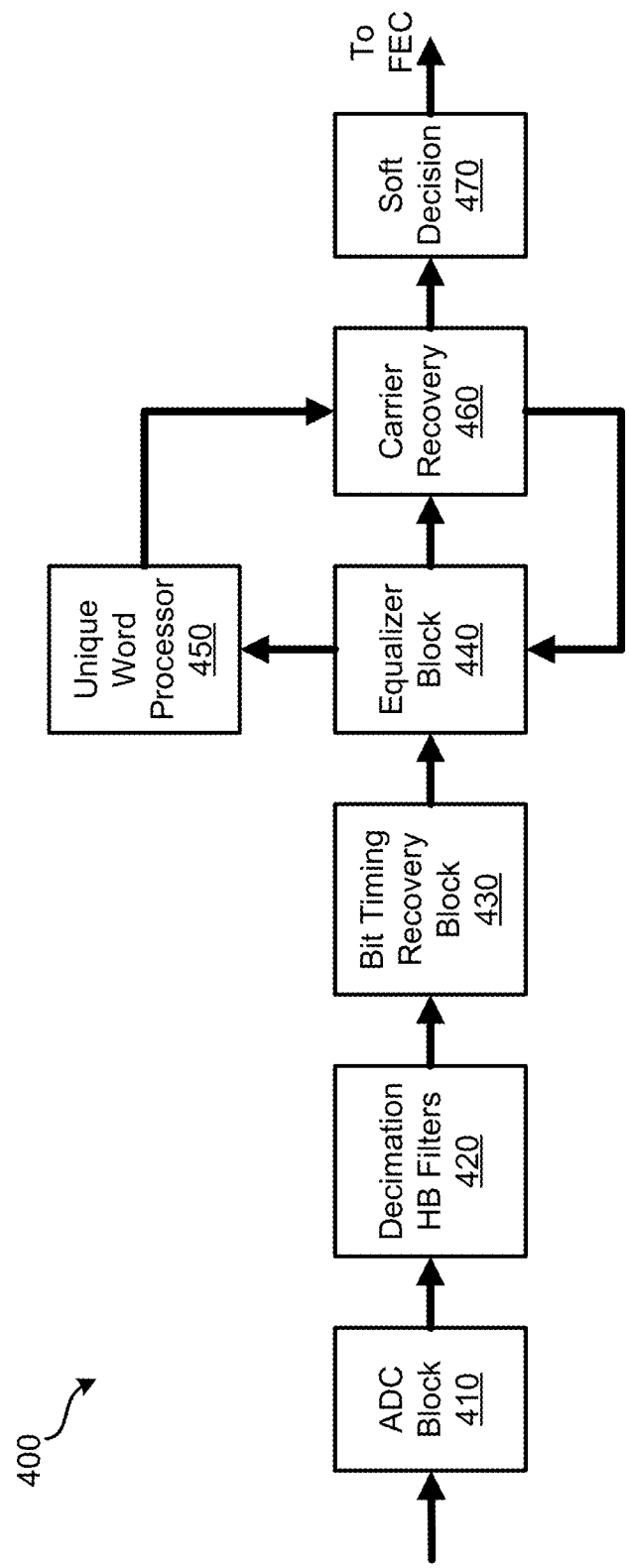
FIG. 4 shows a simplified block diagram of conventional implementation of continuous mode satellite terminal receiver.

For added context, FIG. 4 shows a simplified block diagram of conventional implementation of continuous mode satellite terminal receiver 300. The illustrated satellite terminal receiver 300 is an example of a conventional type of receiver path compatible with modern high-throughput satellite standards, such as the second-generation Digital Video Broadcasting by Satellite (DVB-S2) standards and their extensions (DVB-S2X), such as defined in European Standards EN 302 307-1 and EN 302 307-2. As illustrated, an analog forward downlink signal is received by an analog to digital conversion (ADC) block 410, where the analog signal is converted to digital samples. The digital samples can be passed through one or more half-band filters, or the like, referred to generally as "decimation HB filters," 420 to downsample the samples to a common sample rate (e.g., between 2 to 4 samples/symbol) appropriate for presentation to downstream blocks.

A bit timing recovery (BTR) block 430 attempts to obtain and maintain a lock on the bit timing from the stream of samples by tracking symbol rate drift. As described above, though a signal is being received at some nominal bitrate, the actual received bitrate can drift to either side of the nominal bitrate (corresponding to the center frequency, as illustrated by FIGS. 3A and 3B). The BTR block 430 tries to lock onto and track the drifting bit timing to output a bitstream with a constant sample rate (e.g., 2 samples/symbol). As described above, conventional satellite channel filter responses tend to be substantially symmetric, which tends to support reliable performance of the BTR block 430.

The constant-sample-rate bitstream can be passed to an equalizer block 440. For example, the equalizer block 440 can be a fractional equalizer operating at 2 samples/symbol, such that it is insensitive to bit timing offsets. The output of the equalizer block 440 can be passed to a unique word processor block 450 to locate a unique word and to decode header information indicating modulation and coding information. For example, the physical layer signaling (PLS) header (e.g., defined in the DVB-S2 standard) indicates the modulation and forward error correction (FEC) rate of the current frame. Such information can be used to maintain frame synchronization. The output of the equalizer block 440 and the unique word processor block 450 can both be passed to a carrier recovery block 460, which can track residual frequency and phase distortion. The carrier recovery block 460 can also compute error information to update equalizer coefficients, which can be fed back to the equalizer block 440. Output from the carrier recovery block 460 can be passed to a soft decision block 470 to estimate soft decision values to be sent to downstream components, such as a forward error correction (FEC) subsystem.

Typically, the BTR block 430 includes a second-order loop that tracks symbol timing offsets. Second-order loops are preferable, as they are well understood and do not tend to have stability issues when compared to higher order loops. For example, the loop bandwidth is typically set to 2% of the symbol rate to have reasonable dynamic tracking ability, while maintaining low noise. Asymmetric satellite filter responses can cause large timing jitter in the BTR loop. The increased timing jitter can result in the BTR block 430 losing lock and not being able to proceed with demodulation (i.e., not being able to output a constant-sample-rate bitstream). In response to the BTR block 430 losing lock, the receiver (demodulator) is typically configured to repeat the acquisition process in an attempt to recover. If the BTR block 430 continues to be unable to achieve and maintain lock, an endless loop can result. As noted above, a conventional approach to ensuring that the BTR block 430 maintains lock is to reduce the symbol rate, such that the signal reliably lies within the symmetric portion of the satellite channel filter. However, reducing the symbol rate results in reduced capacity on the forward link.

Embodiments described herein introduce a pre-equalizer ahead of the BTR block 430 to compensate for the asymmetric responses of the satellite channel filters. The pre-equalizer is designed so that the input to the BTR block 430 manifests substantially symmetric magnitude and phase response characteristics over the entire nominal bandwidth of the satellite channel filter, even if the satellite channel filter produces an asymmetric response. Accordingly, the BTR block 430 is able to obtain and maintain lock based on the symmetric response output of the pre-equalizer, thereby supporting symbol rates that span both the symmetric and otherwise asymmetric regions of the satellite channel filter. Supporting symbol rates even into the asymmetric response portions of the satellite channel filters (e.g., across substantially the entire filter bandwidth) can appreciably improve the forward-link capacity of the satellite.

Figure 5:
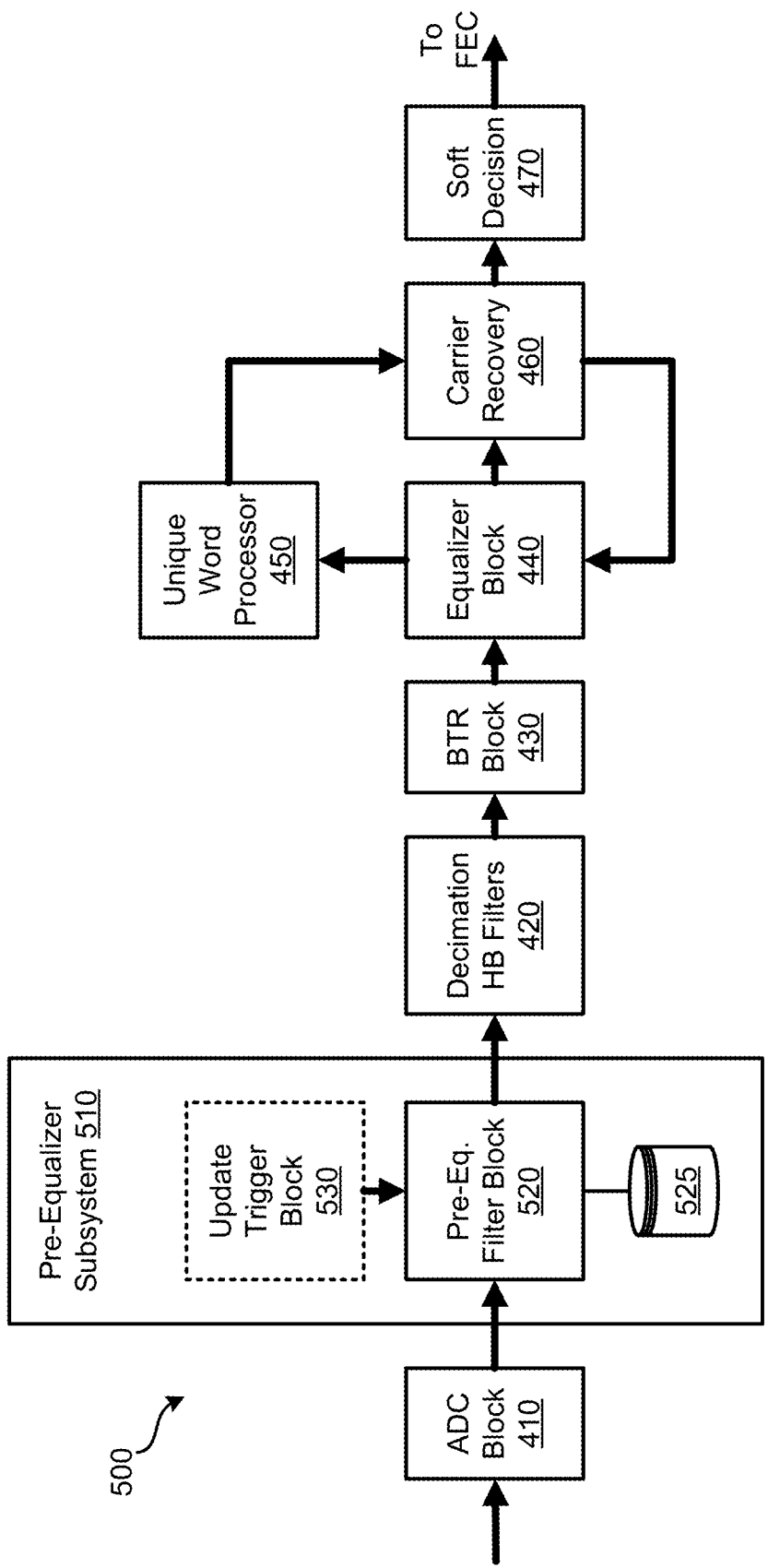
FIG. 5 shows a block diagram of an illustrative implementation of a novel satellite demodulator with a pre-equalizer subsystem, according to embodiments described herein.

FIG. 5 shows a block diagram of an illustrative implementation of a novel satellite demodulator 500 with a pre-equalizer subsystem 510, according to embodiments described herein. For added clarity, portions of the novel satellite demodulator 500 that can be implemented in a similar manner to that of a conventional demodulator (e.g., such as illustrated in FIG. 4) are shown in the same arrangement and with the same labels. It will be appreciated, however, that embodiments of the pre-equalizer subsystem 510 can similarly be integrated into different demodulator architectures to enable the features described herein. The satellite demodulator 500 can be implemented in any suitable satellite terminal, such as terminal 230 of FIG. 2. In such context, the terminal is in forward-link communication with a satellite via a spot beam. For example, the satellite may support a large number of spot beams, at least a portion of which support forward uplink communications from one or more gateways to the satellite, and at least a portion of which support forward downlink communications from the satellite to terminals. For example, a single high-throughput, multibeam satellite may use tens or hundreds of beams to provide satellite communication services to hundreds, thousands, or more terminals in respective coverage areas.

Regardless of the number of spot beams supported by the satellite, a given terminal can be configured to receive forward downlink communications via a particular spot beam at any particular time. As described above, signals communicated via a particular spot beam pass through satellite channel filters associated with that spot beam, and the filter response characteristics can differ among the different satellite channel filters. For example, the filter response plots illustrated in FIG. 3B can represent a first satellite channel filter response associated with a first forward downlink spot beam, and a different second satellite channel filter response can be associated with a second forward downlink spot beam. Forward downlink signals received by a terminal via the first spot beam will manifest characteristics of the first satellite channel filter response, and forward downlinks signals received by a terminal via the second spot beam will manifest characteristics of the second satellite channel filter response.

As such, the analog signal received by the satellite demodulator 500 manifests the channel filter characteristics of the spot beam over which the signal was received. In some or all cases, as noted above, the channel characteristics can include filter distortions, such as asymmetric group delay response with large in-band slope. The signal is received by an ADC block 410 and converted to a stream of digital samples that is similarly impacted by the channel characteristics of the spot beam over which the signal was received. The sample stream output from the ADC block 410 can be passed to the pre-equalizer subsystem 510. In some implementations, the pre-equalizer subsystem 510 is coupled directly with the output of the ADC block 410. In other implementations, as in the conventional demodulator 400 of FIG. 4, the sample stream is passed from the ADC block 410 to the decimation HB filters 420 for downsampling, after which it is passed to the pre-equalizer subsystem 510.

As illustrated, the pre-equalizer subsystem 510 includes a pre-equalizer filter block 520 and a coefficient data store 525. The pre-equalizer filter block 520 is a filter configured to have a transfer function that compensates for filter distortions caused by the satellite channel filters (e.g., the IMUX and OMUX) for the beam over which the satellite demodulator 500 is presently receiving downlink communications. For example, present channel characteristics due to satellite channel filter distortions can be modeled as a channel characteristic transfer function $H(x)$, and the pre-equalizer filter block 520 can be configured to produce a compensation transfer function of approximately $H^{-1}(x)$.

The coefficient data store 525 has at least an active set of coefficients, which, when applied as compensation coefficients of the pre-equalizer filter block 520, cause the pre-equalizer filter block 520 to have the desired transfer function.

Various techniques are known for determining (e.g., estimating) channel characteristics associated with a particular spot beam. As one example, response characteristics of the satellite channel filters for each channel can be measured prior to the satellite being in orbit, such as in a testing laboratory. As another example, special terminals can be used to measure channel characteristics when the satellite is in orbit and operational. As another example, the satellite itself may include a measurement path by which channel characteristics can be periodically measured. In any of these or other examples, the determined (e.g., measured, estimated, etc.) channel characteristics can be modeled by coefficients and/or other information, and the model for each channel's response characteristics can be recorded in a database or any other suitable storage.

The model of channel response characteristics for each spot beam is used to generate a set of compensation filter coefficients to compensate for at least the asymmetric filter distortions manifest in those models. Thus, each spot beam can be associated with a respective set of compensation filter coefficients. In one implementation, a database stores each set of set of compensation filter coefficients in association with the unique beam identifier of its associated spot beam. In some embodiments, the database is human accessible. For example, when a terminal is set up for communication with the satellite, a user (e.g., technician, installer, etc.) can identify a particular downlink spot beam over which the terminal will receive downlink signals, can query the database to retrieve the appropriate set of compensation filter coefficients stored in association with the unique beam identifier for the identified spot beam, and can load the pre-equalizer filter block 520 with the retrieved set of compensation filter coefficients. In some such implementations, the database is accessible to the user via the Internet, or some other location, and the retrieved set of compensation filter coefficients is loaded into the pre-equalizer filter block 520 manually by inputting them to the coefficient data store 525 via a keypad or other interface that is on, connected with, peripheral of, or otherwise usable as an input to the terminal. In other such implementations, an instance (e.g., versioned) of the database is prestored in the coefficient data store 525, and the retrieved set of compensation filter coefficients is loaded into the pre-equalizer filter block 520 by selecting the appropriate previously stored set from the coefficient data store 525 (e.g., by selecting the appropriate spot beam identifier, etc.).

In some implementations, the terminal location is input to the terminal during installation (e.g., manually by an installer, autonomously be using location sensors, etc.). Based on the location, the terminal can be in communication with the satellite via a certain subset of one or more beams that service that location. The terminal can query the coefficient data store 525 to select the appropriate set of compensation filter coefficients for the location based on the beams servicing that location, and the appropriate set of compensation filter coefficients can be loaded into the pre-equalizer filter block 520.

In some cases, the set of compensation filter coefficients is selected for a single particular beam (e.g., based on selecting the beam, selecting the location, etc.). In other cases, the set of compensation filter coefficients is determined based on multiple beams known to service the particular location. For example, a worst case set of compensation filter coefficients can be generated based on a primary beam servicing the terminal location and a diversity gateway beam servicing the terminal location. The worst-case set of compensation filter coefficients becomes the retrieved set of compensation filter coefficients that is loaded into the pre-equalizer filter block 520 (e.g., and from which the pre-equalizer filter block 520 can subsequently dynamically adapt). For example, use of a worst case set of compensation filter coefficients can be effective in implementations where terminals are unaware of a change in servicing beam, such as in case of a diversity gateway taking over during a gateway outage, beam-hopping, or the like.

The sample stream from the ADC block 410 (or from the decimation HB filters 420) are passed through the pre-equalizer filter block 520 that is configured with the appropriate set of compensation filter coefficients (entered into or selected from the coefficient data store 525). As such, the sample stream as received at the input to the BTR block 430 no longer manifests asymmetric filter distortions from the satellite channel. As described above, without such distortions, the BTR block 430 can reliably lock onto and track bit timing even with some symbol rate drift, so that the BTR block 430 can output a constant-sample-rate bitstream. The constant-sample-rate bitstream can be passed to the equalizer block 440, the output of the equalizer block 440 can be passed to a unique word processor block 450, and the outputs of the equalizer block 440 and the unique word processor block 450 can both be passed to a carrier recovery block 460. Output from the carrier recovery block 460 can be passed to a soft decision block 470 (and error computed by the carrier recovery block 460 can be fed back to the equalizer block 440). Output from the soft decision block 470 be sent to downstream components, such as a forward error correction (FEC) subsystem.

The illustrated pre-equalizer subsystem 510 can operate well in context of a satellite channel with a substantially unchanging (static) response characteristic over time. Still, some embodiment of the satellite demodulator 500 can adapt to certain types of changes in channel response characteristics. One reason channel response characteristics can change is based on terminal mobility. For example, a terminal can be designed as a mobile terminal, or even a fixed-location terminal can change location on occasion, such that the terminal must at times be reassigned to a new spot beam at least for its forward downlink communications. This can happen more often for certain types of mobile terminals, which can be handed off to different spot beams as they leaves one coverage area and enters the next. A second reason channel response characteristics relates to infrastructure changes. For example, a gateway may become temporarily or permanently unavailable (e.g., because of technical issues, because it is being repaired, because of communication link failures between the gateway and the satellite, etc.), or a new gateway may come online (e.g., after a repair, as a network grows, etc.). In such cases, some satellite network architectures provide for dynamic reassignment of affected terminals to a new gateway as needed or desired by the network, and communications with the newly assigned gateway may correspond to a different satellite channel with different channel response characteristics.

The above reasons for changes in channel response both effectively result in a new channel with new channel response characteristics. As illustrated, some embodiments of the pre-equalizer subsystem 510 include an update trigger block 530. In some embodiments, before the terminal is handed over to a new satellite channel (e.g., for the above reasons), the network can send a message via the current satellite channel to the update trigger block 530 to wait for a reassignment message, and to automatically update the set of compensation filter coefficients to those associated with the new satellite channel responsive to the reassignment message.

Figure 6:
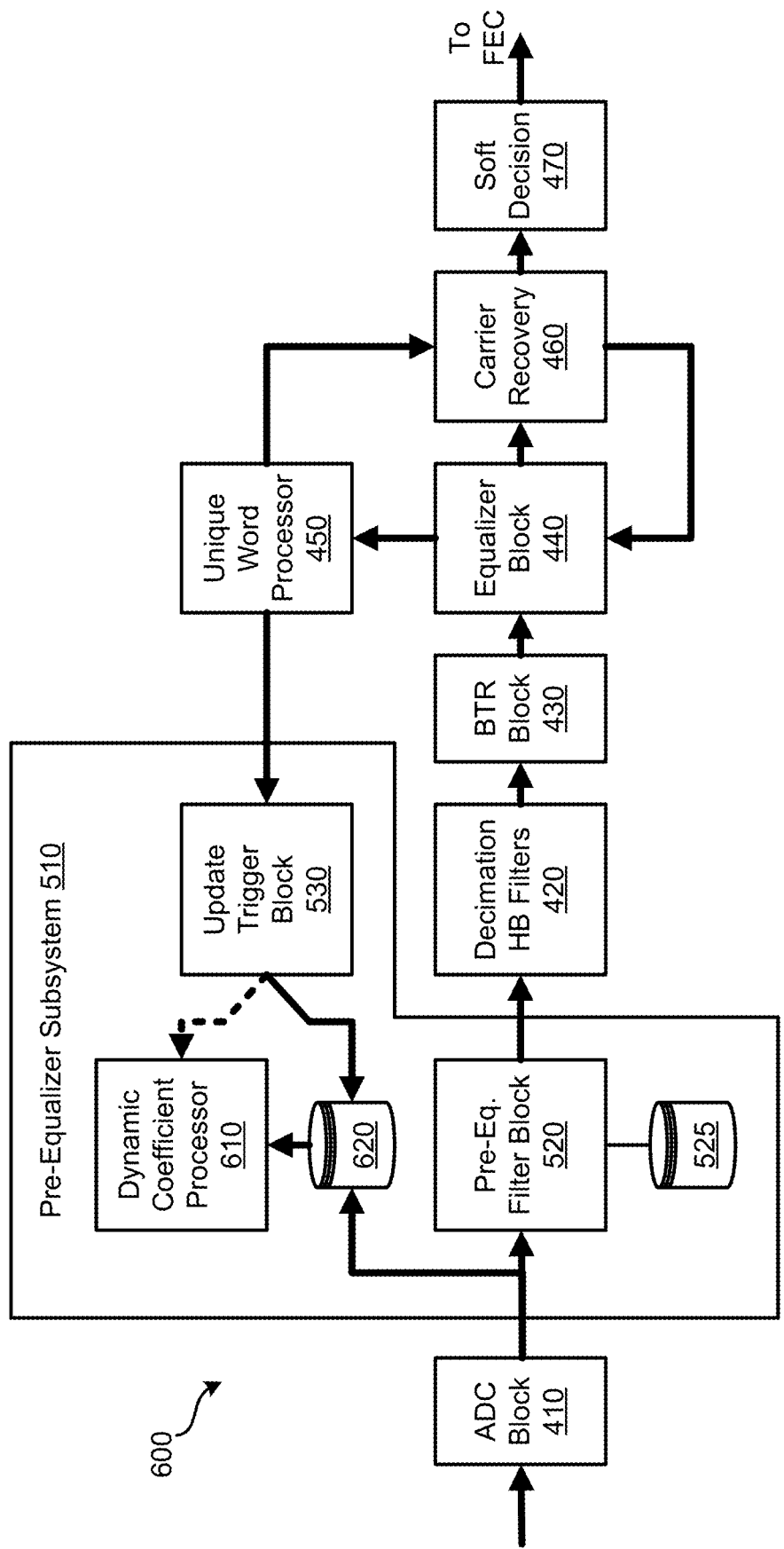
FIG. 6 shows a block diagram of another illustrative implementation of a novel satellite demodulator with a pre-equalizer subsystem that provides additional dynamic adaptation features, according to embodiments described herein.

FIG. 6 shows a block diagram of another illustrative implementation of a novel satellite demodulator 600 with a pre-equalizer subsystem 510 that provides additional dynamic adaptation features, according to embodiments described herein. The satellite demodulator 600 is similar to the satellite demodulator 500 of FIG. 5, except that the pre-equalizer subsystem 510 can dynamically and responsively adapt to changes in channel response characteristics over time. As described above, satellite channel characteristics can change from the perspective of the terminal due to reassignment of the terminal to a different satellite channel. Additionally, the filter response characteristics even of the same satellite channel can be dynamic. For example, the responses of the satellite channel filters can change over time due to changes in temperature, power, electromagnetic noise, and/or other environmental effects.

As described with reference to FIG. 5, the pre-equalizer subsystem 510 includes a pre-equalizer filter block 520, a coefficient data store 525, and an update trigger block 530. As illustrated, the dynamically adaptive pre-equalizer subsystem 510 illustrated in FIG. 6 further includes a dynamic coefficient processor 610 and a training buffer 620. Except as otherwise noted, remaining components of the satellite demodulator 600 can operate substantially as described above and are illustrated in the same arrangement with the same reference designators, accordingly. As in embodiments described above, the satellite demodulator 600 can be implemented in any suitable satellite terminal and operates to receive forward downlink communications from a satellite via a spot beam (e.g., of one or more spot beams supported by the satellite).

As described above, forward downlink signals received by the satellite demodulator 600 via the spot beam will manifest asymmetric filter distortions and/or other satellite channel filter response characteristics associated with the spot beam. These same channel characteristics also manifest on the digital sample stream that is generated by the ADC block 410 from the received analog forward downlink signals and provided at the input to the pre-equalizer filter block 520 (e.g., with or without further pre-processing, such as decimation or downsampling by the decimation HB filters 420). A model of the channel characteristics can be used to determine an initial set of compensation filter coefficients with which to configure the pre-equalizer filter block 520, such as in any of the various way described with reference to FIG. 5.

It can be assumed that, at some first time, the pre-equalizer filter block 520 is configured with a first set of compensation filter coefficients that sufficiently compensate for any satellite channel filter distortions so that the BTR block 430 is able to obtain and maintain lock (e.g., to reliably track symbol rate drift, etc.). For example, this first set of compensation filter coefficients may have been manually set up as part of initializing the terminal, updated as part of a handover routine, adaptively configured as described below, etc. It can be further assumed that the channel characteristics are dynamic; they can change over time, for example, due to changes in satellite temperature in the region of the channel filters. If the channel characteristics change too much (e.g., become too asymmetric, etc.), the BTR block 430 will lose lock, and the satellite demodulator 600 may not be able to operate properly. Thus, the illustrated pre-equalizer subsystem 510 includes an adaptation path that can be triggered by detection of a predetermined training sequence to recompute and update the set of compensation filter coefficients used to configure the pre-equalizer filter block 520. By continuing to update the set of compensation filter coefficients over time, the pre-equalizer filter block 520 can continue to compensate for satellite channel filter distortions, even when they are time-varying.

The illustrated pre-equalizer subsystem 510 includes both a demodulation path and an adaptation path. As samples of the sample stream are output by the ADC block 410, they can be routed simultaneously to both the demodulation path and the adaptation path. In the demodulation path, the symbols are routed to the pre-equalizer filter block 520. In the adaptation path, the symbols are routed to the training buffer 620. The training buffer can be a FIFO queue, circular buffer, or any other suitable type of memory that is at least large enough to buffer the training sequence for at least a predetermined trigger delay, as described below.

Figure 7:
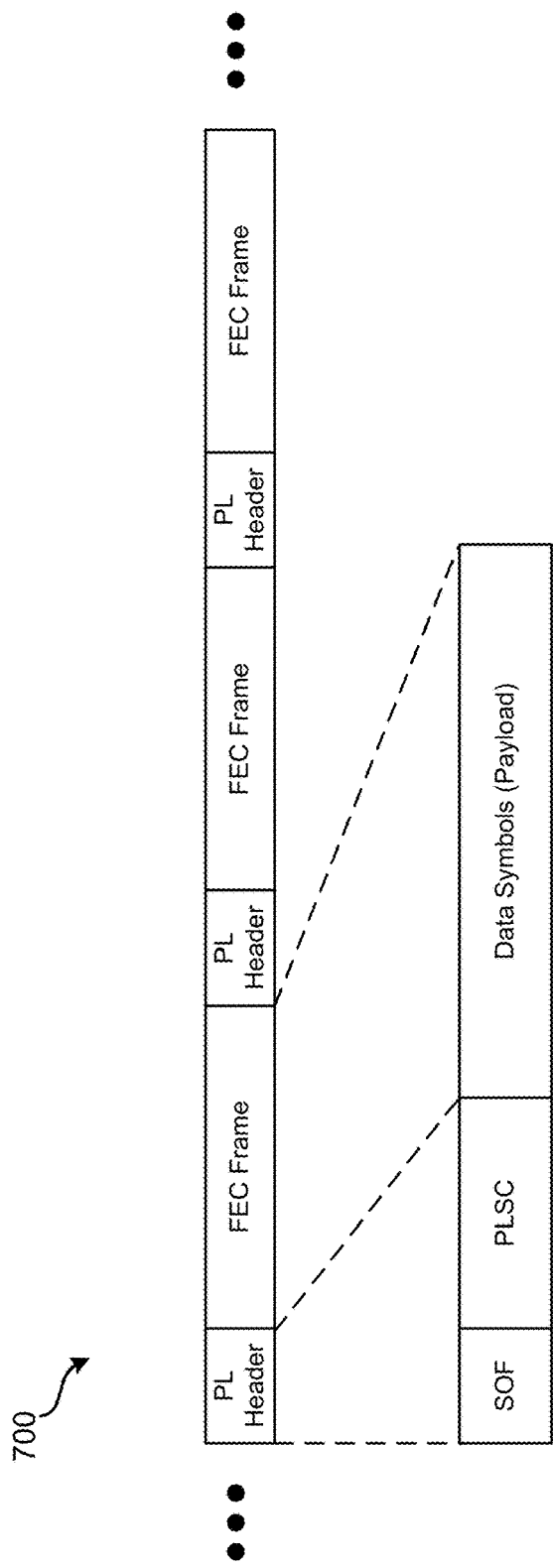
FIG. 7 shows an illustrative portion of a conventional continuous DVB-S2/S2X downlink stream.
Figure 8:
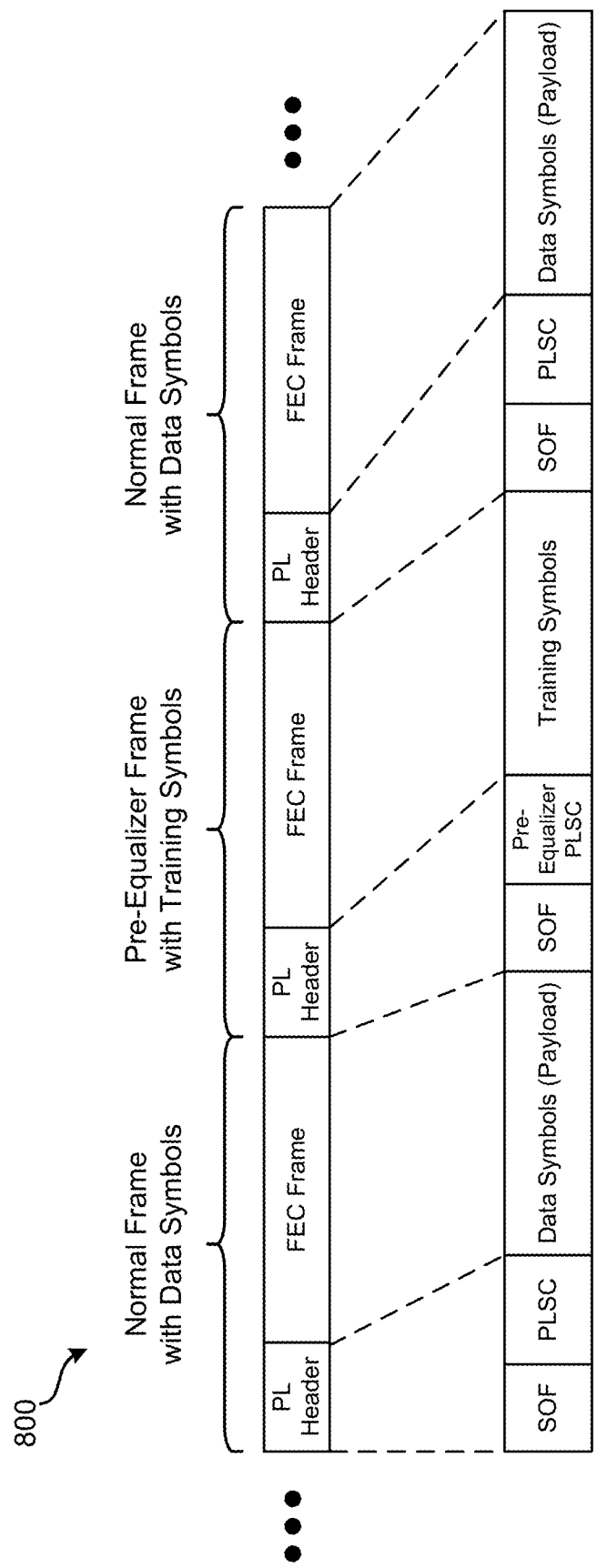
FIG. 8 shows an illustrative portion of a novel continuous DVB-S2/S2X downlink stream, according to various embodiments described herein.

As noted above, dynamic adaptation by the pre-equalizer subsystem 510 involves receipt, decoding, and detection of a training sequence. For added context to such a training sequence, FIGS. 7 and 8 show examples of partial forward downlink stream schemas. Turning first to FIG. 7, an illustrative portion of a conventional continuous DVB-S2/S2X downlink stream is shown. In such a continuous stream, downlink frames are present back-to-back. Each downlink frame includes a PL (Physical Layer) Header, followed by an FEC Frame (Payload). The PL Header includes a SOF (Start of Frame) field and a PLSC (Physical Layer Signaling Code) field. The SOF field is used by demodulators to detect the presence of the frame, and the PLSC field defines the modulation and FEC rate of the frame. As described above, both the conventional and novel demodulator paths include a unique word processor block 450 to decode portions of the received ad equalized symbol stream. In this way, the unique word processor block 450 decodes the PLSC field and provides other components of the demodulator with the modulation and FEC rate.

To support dynamic adaptation by the novel pre-equalizer subsystem 510 of FIG. 6, the downlink frame can be configured to include a new code field without departing from underlying standards (e.g., while operating within the DVB-S2/S2X standards). FIG. 8 shows an illustrative portion of a novel continuous DVB-S2/S2X downlink stream, according to various embodiments described herein. The illustrative portion of the downlink stream is used to periodically send a pre-negotiated sequence of symbols, referred to herein as a "training sequence." For example, an unused PLS code (not explicitly allocated for use in existing standards, protocols, etc.) can be allocated for pre-equalizer coefficient updates to support embodiments described herein. The newly allocated PLS code is illustrated as "Pre-Equalizer PLSC." The pre-equalizer PLSC can introduce a payload with the training sequence. Together, the pre-equalizer PLSC code and the training sequence can be referred to as a pre-equalizer frame. Pre-equalizer frames can be periodically inserted into the downlink stream at any suitable times and/or regularity. For example, pre-equalizer frames can be transmitted a few times each day, each during an off-peak traffic period, so as to mitigate any capacity impact.

Returning to FIG. 6, output samples from the ADC block 410 are routed both to the demodulation path and to the adaptation path. At some time, the output samples will represent a pre-equalizer frame. The samples will be processed by the decimator HB filters 420, the BTR block 430, and the equalizer block 440 before being decoded by the unique word processor block 450. Thus, after some delay, the unique word processor block 450 will decode the pre-equalizer frame, and the decoding of the frame will trigger an update to the set of compensation filter coefficients. In the illustrated implementation, decoding of the pre-equalizer frame by the unique word processor block 450 is detected by the update trigger block 530, which generates an update trigger message. The update trigger message can be provided to the training buffer 620. Because the same sample stream is being simultaneously routed through both the demodulation path and the adaptation path, the training sequence of symbols will have been routed to the training buffer 620. The update trigger can arm the training buffer 620 to capture the incoming ADC samples. For example, the training buffer 620 has a fixed size that is large enough, so that the training sequence is still within the training buffer 620 even after an amount of delay between the receipt of the pre-equalizer frame by the ADC block 410 and the decoding of the pre-equalizer frame by the unique word processor block 450. In one implementation, the size of the training buffer 620 is designed to be large enough to capture at least two of the pre-equalizer frames. Once the memory has been filled, an interrupt (e.g., any suitable flag, bit, signal, etc.) can be generated.

The interrupt can be used to trigger computation of an updated set of compensation filter coefficients by the dynamic coefficient processor 610, which is coupled with the training buffer 620. Alternatively, the dynamic coefficient processor 610 can be triggered by the trigger message from the update trigger block 530 and can direct and detect capturing of symbols by the training buffer 620, accordingly. The dynamic coefficient processor 610 can be implemented as a system-on-chip (SOC), or in any suitable manner. In some implementations, the computation of an updated set of compensation filter coefficients by the dynamic coefficient processor 610 can be performed in the following manner. The dynamic coefficient processor 610 can detect presence of the pre-equalizer frame by correlating with the SOF sequence. The dynamic coefficient processor 610 can then estimate the received training sequence symbols using the ADC block 410 output samples as stored in the training buffer 620. The dynamic coefficient processor 610 can then compute an error function as between the predefined training sequence and the received training sequence symbols. The dynamic coefficient processor 610 can then compute a new set of compensation filter coefficients based on the error function. Some implementations use a least mean squares algorithm, or other suitable adaptive filter algorithm, to compute the updated coefficients. The dynamic coefficient processor 610 can then update the pre-equalizer filter block 520 with the new set of compensation filter coefficients. For example, the new set of compensation filter coefficients is loaded into the coefficient data store 525 and/or overwrites the previous set of compensation filter coefficients. The computation can be adapted to the number of filter taps of the pre-equalizer filter block 520 (e.g., 15 or 29 taps).

As one example, reference samples are captured at 476× $10^6$ and 952× $10^6$ Megasamples per second (Msps). The dynamic coefficient processor 610 normalizes power prior to using the samples for computation. The dynamic coefficient processor 610 can then find a start index for the training sequence in the captured data, for example, by using a 256 long correlator in the power domain. The start index location can be used to correlate and estimate phase and frequency. The frequency estimate and amplitude corrections can be applied to compute the set of compensation filter coefficients. For example, the dynamic coefficient processor 610 can define a coefficient array of length, L=2*nTaps+1, where nTaps is the number of filter taps. The first side of the array can be set as an impulse (e.g., the center tap=1). The dynamic coefficient processor 610 can then initialize an L×L identity matrix (P). A delta inverse ($1\times 10^{-6}$) can be applied to the P matrix. The dynamic coefficient processor 610 can reformat a corrected captured data vector (C) into Y=[C*1] and can compute the following matrix operations with a respective normalization factor for each: $Y^H*P$; $Y^H*P*Y$; and P*Y. The dynamic coefficient processor 610 can compute a difference matrix between the reference data and the captured data and can use the difference matrix and the PY matrix to obtain the updated set of compensation filter coefficients.

A more detailed example is as follows. Reference symbols, $\{S_{REF}(k), k=0, 1, \ldots, 3401\}$, are made of one dummy PLFRAME of PLSCODE 1 with 3402 symbols. Note that dummy PLFRAME's payload is made of all zero QPSK symbols being channel scrambled according to DVB-S2 standards. Alternatively, instead of using the dummy PLFRAME, a custom frame can be used for training purposes. For generating the reference samples with the symbol rate of 952 Msps and rolloff factor of 0.05 at the sampling rate of 2 Gigasamples per second (Gsps), reference symbols can be filtered through a root raised cosine spectrum pulse with the rolloff factor of 0.05 and sampled at 2 Gsps by:

$$r_{REF}(k) = \sum_{m=-L}^{L} S_{REF}\left(\left(m + \left\lfloor \frac{119 \cdot k}{250} \right\rfloor + 3402\right) \bmod 3402\right) \cdot$$

$$p_{SRRC}(((119 \cdot k) \bmod 250) - 250 \cdot m)$$

where $\{p_{SRRC}(k), k=-250\cdot L, -250\cdot L+1, \ldots, -1, 0, 1, \ldots, 250\cdot L-1, 250\cdot L\}$ is the set of root raised cosine spectrum pulse for 250 times oversampled over $2\cdot L$ symbols. The example can be adapted to any other suitable symbol rates and sampling rates.

The set of reference symbols are used in the circular manner to make the end meet the start, and 250 times upsampling and 119 times downsampling are performed to convert 952 Msps to 2 Gsps. Similar techniques can be applied for the combination of the symbol rate of 476 Msps with the sampling rate of 1 Gsps, so that one set of reference samples can be applied to 2 Gsps and to 1 Gsps. These reference samples can be the desired samples as ADC outputs, if there are no impairments over the channel up to the ADC block 410 input port.

With the set of reference symbols repeatedly sent over the channel to be probed, ADC block 410 outputs can be captured at least more than two repetitions of one period of reference symbols as $\{r_{RX}(k), k=0, 1, \ldots, N_{RX}-1\}$, where $N_{RX}$ is the number of samples being captured to have whole period of reference samples be present. The first thing is to locate the start of the set of reference symbols or samples by computing the correlations between captured data and the start of reference samples, $$\left\{\text{corr}(k) = \sum_{m=0}^{N_K-1} r^*_{REF}(m) \cdot r_{RX}(k+m), k = 0, \ldots, N_{RX} - N_K - 1\right\}$$

and finding the index, $k_m$, of the first peak over the first half of correlations by $$|\text{corr}(k_m)| = \max_{k=0,1,\ldots\frac{N_{RX}}{2}-1} |\text{corr}(k)| \quad 5$$

With $\{r_{RX}(k+k_m), k=0, 1, \ldots, N_{TRAIN}-1\}$, where $N_{TRAIN}$ is the number of samples, the frequency offset if any is estimated by measuring phases of multiple correlations, each of which is separated in time equally for the sake of ease by $$\left\{\text{corr}(k) = \sum_{m=0}^{N_C-1} r^*_{REF}(N_C \cdot k + m) \cdot r_{RX}(N_C \cdot k + m), k = 0, \ldots L_K - 1\right\} \text{ and}$$

$$\{\emptyset(k) = a\tan2(\text{Im}[\text{corr}(k)], \text{Re}[\text{corr}(k)]), k = 0, \ldots, L_K - 1\}$$

to estimate the frequency offset by $$F_{EST} = \frac{[\emptyset(1) - \emptyset(0) + \pi] \mod(2 \cdot \pi) - \pi}{N_C \cdot 2 \cdot \pi} \quad 25$$

with two measurements or $$F_{EST} = \frac{\sum_{k=0}^{L_K-1} k \cdot \sum_{k=0}^{L_K-1} \hat{\emptyset}(k) - L_K \cdot \sum_{k=0}^{L_K-1} k \cdot \hat{\emptyset}(k)}{N_C \cdot 2 \cdot \pi \cdot \left[\left(\sum_{k=0}^{L_K-1} k\right)^2 - L_K \cdot \sum_{k=0}^{L_K-1} k^2\right]}$$

with $\{\hat{\emptyset}(0)=\emptyset(0), \hat{\emptyset}(k)=\hat{\emptyset}(k-1)+(\emptyset(k)-\emptyset(k-1)+\pi) \mod (2\cdot\pi)-\pi, k=1, \ldots, L_K-1\}$.

With the frequency estimate, the reference data are modified to remove the frequency offset by $$\{r_{RX,l}(k)=r_{REF}(k+k_m)\cdot\exp[j\cdot 2\cdot\pi\cdot F_{EST}k], k=0,1,\ldots,N_{TRAIN}-1\}$$

before being used to train the pre-equalizer filter block 520.

The pre-equalizer filter block 520 can be made up of two FIR filters, $\{G_0(k), k=0, 1, \ldots, N_{IQI}-1\}$ and $\{G_1(k), k=0, 1, \ldots, N_{IQI}-1\}$, where $N_{IQI}$ is the number of taps of FIR filter being 15 or 31, and the output is derived by $$r_{IQI}(k) = \sum_{m=0}^{N_{IQI}-1} r(k-m) \cdot G_0(m) + \sum_{m=0}^{N_{IQI}-1} r^*(k-m) \cdot G_1(m) + C_{COR}$$

where $C_{COR}$ is the correction factor. Coefficients of two FIR filters are derived with captured data and modified reference, and G0 and G1 can be computed by $[G_0, G_1, C_{COR}, \text{error}, z]=\text{RLS\_Widely\_Linear\_eqlzr\_stacked}(r_{RX,I}, r_{REF}, (N_{IQI}-1)/2, 1., 1.\text{e-6})$.

An example of MATLAB code for implementing a function to compute the coefficients is as follows:

```
function [g1, g2, c, error, z]=RLS_Widely_Lin-
    ear_eqlzr_stacked(input, reference, memory_length_1side, lambda, delta)

length_W=2*(2*memory_length_1side+1);
``` center=1+memory_length_1side;

W=zeros(size([1:length_W]));

W(center)=1.0;

P=1/delta*eye(length(W)+1);

W=W.';

index=1;

z=zeros(1,length(input)-2*memory_length_1side);

error=zeros(1,length(input)-2*memory_length_1side);

W_padded=[W;0];

for k=memory_length_1side+1:length(input)-memory_length_1side

Figure 9:
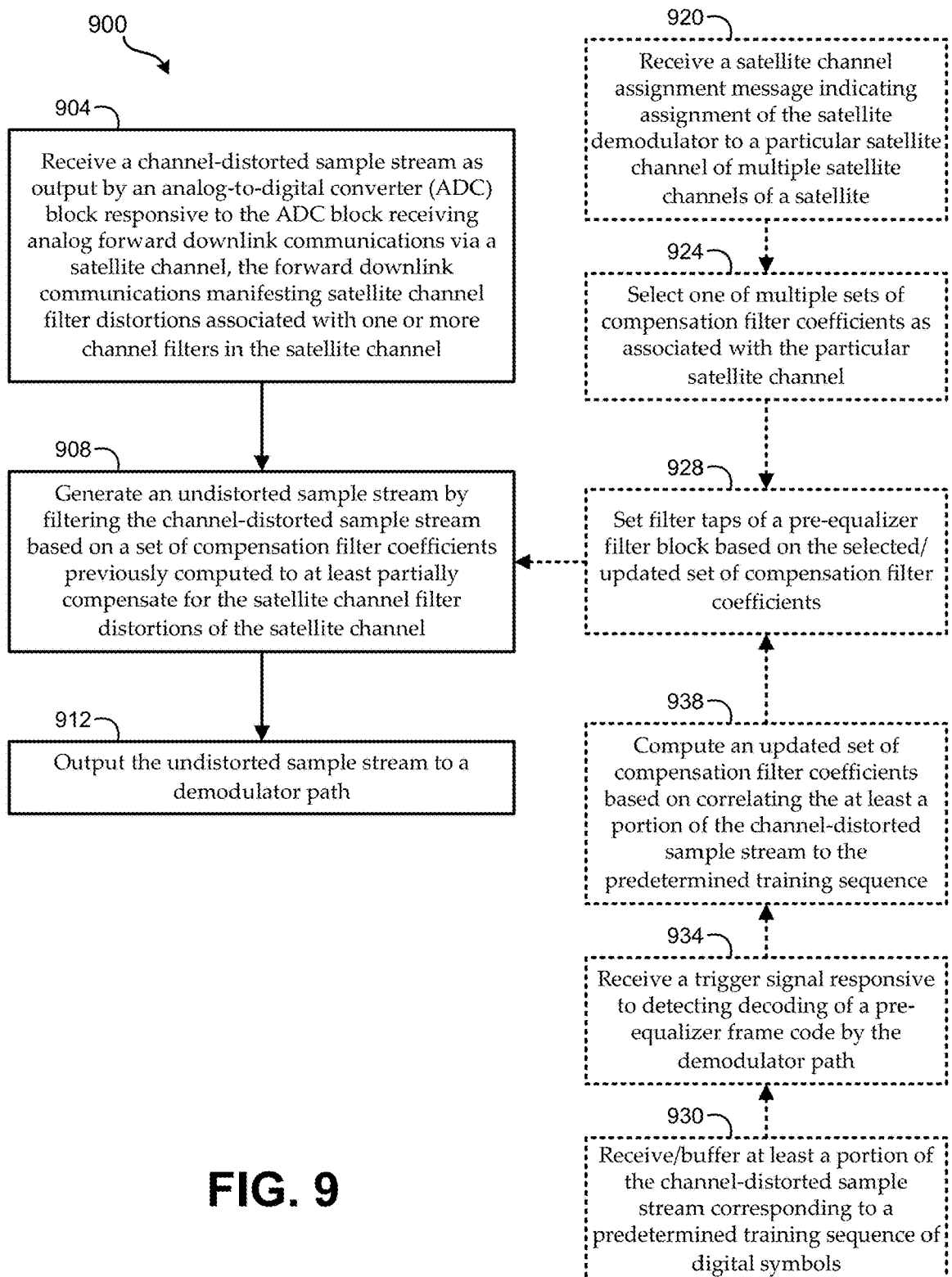
FIG. 9 shows a flow diagram of an illustrative method for satellite channel filter distortion compensation in a satellite demodulator, according to various embodiments described herein.

Y_vec_linear=(input(k-memory_length_1side:k+memory_length_1side));

Y_vec_linear_mirror=conj(input(k-memory_length_1side:k+memory_length_1side));

[Y_vec_all]=[Y_vec_linear Y_vec_linear_mirror 1.0].';

pi_n=Y_vec_all'*P;

kappa=lambda+pi_n*Y_vec_all;

k_n=(P*Y_vec_all)/kappa;

Z=W_padded'*Y_vec_all;

e=reference(k)-Z;

W_padded=W_padded+k_n*conj(e);

P=1/lambda*(P-k_n*pi_n);

error(index)=e;

z(index)=Z;

index=index+1;

end error=error/sqrt(mean(abs(reference).^2));

g1=W_padded(1:length(W)/2);

g2=W_padded(length(W)/2+1:end-1);

g1=conj(flipud(g1));

g2=conj(flipud(g2));

c=conj(W_padded(length(W)+1));

FIG. 9 shows a flow diagram of an illustrative method 900 for satellite channel filter distortion compensation in a satellite demodulator, according to various embodiments described herein. The method 900 can be implemented using any suitable satellite demodulator that includes pre-equalization, such as those described above. Embodiments begin at stage 904 by receiving a channel-distorted sample stream as output by an analog-to-digital converter (ADC) block responsive to the ADC block receiving analog forward downlink communications via a satellite channel. The forward downlink communications manifest satellite channel filter distortions associated with one or more channel filters in the satellite channel, such as IMUX and OMUX filters. In some embodiments, the satellite channel is one of multiple (e.g., tens or hundreds) of satellite channels of a satellite, each having its own satellite channel filters that manifest respective satellite channel filter distortions. As described herein, the satellite channel filter distortions can include asymmetric magnitude and/or filter response over the bandwidth of the filters, such as asymmetric group delay response with large in-band slope.

At stage 908, embodiments can generate an undistorted sample stream by filtering the channel-distorted sample stream based on a set of compensation filter coefficients. The set of compensation filter coefficients is previously computed to at least partially compensate for the satellite channel filter distortions of the satellite channel. At stage 912, embodiments can output the undistorted sample stream to a demodulator path.

The set of compensation filter coefficients can be selected from multiple previously computed and stored sets of compensation filter coefficients (e.g., as per optional stages 920, 924, and 928), previously adapted (e.g., as per stages 930, 934, 938, and 928), set manually via an interface, and/or otherwise configured based on previous computation. For example, at stage 920, some embodiments can receive a satellite channel assignment message indicating assignment of the satellite demodulator to a particular satellite channel of multiple satellite channels of a satellite. As noted above, in such an embodiment, each satellite channel has a respective one or more channel filters producing respective satellite channel filter distortions associated with the satellite channel. At stage 924, some such embodiments can select, based on the satellite channel assignment message, a selected set of compensation filter coefficients from among multiple sets of compensation filter coefficients as stored in association with the particular satellite channel. In such an embodiment, each set of compensation filter coefficients can be previously computed to at least partially compensate for the respective satellite channel filter distortions of a respective one of the plurality of satellite channels, and can be stored in a coefficient data store in association with a respective channel identifier of the respective one of the plurality of satellite channels. At stage 928, some such embodiments can set filter taps of a pre-equalizer filter block, such that the generating the undistorted sample stream is by filtering the channel-distorted sample stream based on the selected set of compensation filter coefficients.

Alternatively or additionally, some embodiments can update filter coefficients periodically and dynamically based on training data communicated over the satellite channel. For example, at stage 930, some embodiments can receive at least a portion of the channel-distorted sample stream corresponding to a predetermined training sequence of digital symbols. In some such embodiments, the receiving at stage 930 can include buffering the channel-distorted sample stream in a training buffer (e.g., simultaneously, or otherwise in parallel with the generating at stage 908). At stage 934, some such embodiments can receive a trigger signal responsive to detecting decoding of a pre-equalizer frame code by the demodulator path. For example, the forward downlink communications include a sequence of communication frames having at least one pre-equalizer frame that each encodes an instance of the pre-equalizer frame code and an instance of a predetermined training sequence of digital symbols. In such cases, the trigger signal can indicate receipt of the at least one pre-equalizer frame and corresponding presence in the training buffer of a segment of the channel-distorted sample stream representing at least the predetermined training sequence of digital symbols. At stage 938, some such embodiments can compute an updated set of compensation filter coefficients based on correlating the at least a portion of the channel-distorted sample stream to the predetermined training sequence. For example, the correlation can be based on a start of frame (SOF) sequence at the beginning of the pre-equalizer frame. Embodiments can proceed to stage 928, where embodiments can set filter taps of a pre-equalizer filter block, such that the generating the undistorted sample stream is by filtering the channel-distorted sample stream based on the updated set of compensation filter coefficients.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A satellite demodulator comprising:
an analog-to-digital converter (ADC) block to receive analog forward downlink communications via a satellite channel and to output a corresponding stream of digital samples, the forward downlink communications manifesting satellite channel filter distortions associated with one or more channel filters in the satellite channel, such that the stream of digital samples is a channel-distorted sample stream, wherein the forward downlink communications includes a sequence of communication frames having at least one pre-equalizer frame that encodes a pre-equalizer frame code and a predetermined training sequence of digital symbols;
a demodulator path to generate a digital symbol stream from an undistorted sample stream; and
a pre-equalizer subsystem comprising:
a training buffer coupled with the ADC block to receive the channel-distorted sample stream;
an update trigger block to generate a trigger signal responsive to detecting decoding of the pre-equalizer frame code by the demodulator path, the trigger signal indicating receipt via the ADC block of the at least one pre-equalizer frame resulting in presence in the training buffer of a segment of the channel-distorted sample stream representing at least the predetermined training sequence of digital symbols;
a dynamic coefficient processor to:
receive at least a portion of the channel-distorted sample stream corresponding to the predetermined training sequence of digital symbols from the training buffer responsive to the trigger signal;
compute an updated set of compensation filter coefficients based on correlating the at least a portion of the channel-distorted sample stream to the predetermined training sequence; and
output the updated set of compensation filter coefficients; and
a pre-equalizer filter block coupled between the ADC block and the demodulator path to generate the undistorted sample stream by filtering the channel-distorted sample stream based on the set of compensation filter coefficients previously computed by the dynamic coefficient processor to at least partially compensate for the satellite channel filter distortions of the satellite channel.

2. The satellite demodulator of claim 1, wherein the satellite channel filter distortions include asymmetric group delay over the bandwidth of the one or more channel filters.

3. The satellite demodulator of claim 1, wherein the satellite channel is one of a plurality of satellite channels, each satellite channel having a respective one or more channel filters producing respective satellite channel filter distortions associated with the satellite channel, and the pre-equalizer subsystem further comprises:
a coefficient data store having a plurality of sets of compensation filter coefficients stored thereon, each set of compensation filter coefficients previously computed to at least partially compensate for the respective satellite channel filter distortions of a respective one of the plurality of satellite channels and stored in association with a respective channel identifier of the respective one of the plurality of satellite channels,
wherein the pre-equalizer filter block is presently configured to filter the channel-distorted sample stream based on a present set of compensation filter coefficients, the present set of compensation filter coefficients previously determined as stored in association with the respective channel identifier of the respective one of the plurality of satellite channels over which the ADC block is presently receiving the forward downlink communications.

4. The satellite demodulator of claim 3, wherein the pre-equalizer subsystem further comprises:
an update trigger block to output a trigger signal responsive to detecting reassignment to a new satellite channel of the plurality of satellite channels,
wherein the pre-equalizer subsystem is configured, responsive to the trigger signal, to update the present set of compensation filter coefficients to a new set of compensation filter coefficients stored in the coefficient data store in association with the respective channel identifier of the new satellite channel.

5. The satellite demodulator of claim 1, wherein:
the at least one pre-equalizer frame is formatted as a digital video by satellite downlink frame with a start of frame (SOF) sequence, the pre-equalizer frame code formatted as a physical layer signaling code, and the training sequence of digital symbols encoded as payload data; and
the dynamic coefficient processor is to compute the updated set of compensation filter coefficients based on correlating at least with the SOF sequence.

6. The satellite demodulator of claim 1, wherein:
representing each pre-equalizer frame in the channel-distorted sample stream consumes N samples at a sampling rate of the ADC block, where N is a positive integer; and
the training buffer is sized to store, at any present time, at least 1.5*N samples of the channel-distorted sample stream preceding the present time.

7. The satellite demodulator of claim 1, wherein the demodulator path comprises a bit timing recovery block, an equalizer block, and a unique word processor.

8. The satellite demodulator of claim 1, wherein the pre-equalizer subsystem further comprises:
a coefficient data store having the set of compensation filter coefficients stored thereon.

9. A pre-equalizer system comprising:
an integrated circuit substrate configured for integration into a satellite demodulator;
a dynamic coefficient processor disposed on the integrated circuit substrate to receive a segment of a channel-distorted sample stream, compute an updated set of compensation filter coefficients based on correlating the segment of the channel-distorted sample stream to a predetermined training sequence, and output the updated set of compensation filter coefficients;
a pre-equalizer filter block disposed on the integrated circuit substrate and having:
an input node configured to couple with an analog-to-digital converter (ADC) output of an ADC block to receive a stream of digital samples generated by the ADC block from analog forward downlink communications received via a satellite channel, the forward downlink communications manifesting satellite channel filter distortions associated with one or more channel filters in the satellite channel, such that the stream of digital samples is the channel-distorted sample stream;
a plurality of filter taps configurable based on the updated set of compensation filter coefficients previously computed by the dynamic coefficient processor to at least partially compensate for the satellite channel filter distortions of the satellite channel; and an output node configured to output, to a demodulator path of the satellite demodulator, an undistorted sample stream by filtering the channel-distorted sample stream according to the plurality of filter taps;

a training buffer disposed on the integrated circuit substrate and coupled with the ADC output to receive the channel-distorted sample stream; and an update trigger block disposed on the integrated circuit substrate to generate a trigger signal responsive to detecting decoding of a pre-equalizer frame code by the demodulator, wherein the forward downlink communications include a sequence of communication frames having at least one pre-equalizer frame that each encodes an instance of the pre-equalizer frame code and an instance of the predetermined training sequence of digital symbols, such that the trigger signal indicates receipt of the at least one pre-equalizer frame and corresponding presence in the training buffer of a segment of the channel-distorted sample stream representing at least the predetermined training sequence of digital symbols, and wherein the dynamic coefficient processor is to receive the segment of the channel-distorted sample stream from the training buffer responsive to the trigger signal.

10. The pre-equalizer system of claim 9, further comprising:

a coefficient data store having a plurality of sets of compensation filter coefficients stored thereon, wherein:

the satellite channel is one of a plurality of satellite channels, each satellite channel having a respective one or more channel filters producing respective satellite channel filter distortions associated with the satellite channel;

each set of compensation filter coefficients is previously computed to at least partially compensate for the respective satellite channel filter distortions of a respective one of the plurality of satellite channels and stored in association with a respective channel identifier of the respective one of the plurality of satellite channels;

wherein the pre-equalizer filter block configurable to filter the channel-distorted sample stream based on a present set of compensation filter coefficients by determining a present satellite channel of the plurality of satellite channels over which the ADC block is presently receiving the forward downlink communications, and by selecting the present set of compensation filter coefficients as the one of the plurality of sets of compensation filter coefficients stored in association with the respective channel identifier of the present satellite channel.

11. The pre-equalizer system of claim 10, further comprising:

an update trigger block to output a trigger signal responsive to detecting reassignment to a new satellite channel of the plurality of satellite channels, wherein the pre-equalizer filter block is configured, responsive to the trigger signal, to update the present set of compensation filter coefficients to a new set of compensation filter coefficients, the new set of compensation filter coefficients being the one of the plurality of sets of compensation filter coefficients stored in the coefficient data store in association with the respective channel identifier of the new satellite channel.

12. The pre-equalizer system of claim 9, wherein:

representing each pre-equalizer frame in the channel-distorted sample stream consumes N samples at a sampling rate of the ADC block, where N is a positive integer; and the training buffer is sized to store, at any present time, at least 1.5*N samples of the channel-distorted sample stream preceding the present time.

13. A method for satellite channel filter distortion compensation in a satellite demodulator, the method comprising:

receiving a channel-distorted sample stream as output by an analog-to-digital converter (ADC) block responsive to the ADC block receiving analog forward downlink communications via a satellite channel, the forward downlink communications manifesting satellite channel filter distortions associated with one or more channel filters in the satellite channel;

buffering the channel-distorted sample stream in a training buffer;

receiving a trigger signal responsive to detecting decoding of a pre-equalizer frame code by a demodulator path, wherein the forward downlink communications include a sequence of communication frames having at least one pre-equalizer frame that each encodes an instance of the pre-equalizer frame code and an instance of a predetermined training sequence of digital symbols, such that the trigger signal indicates receipt of the at least one pre-equalizer frame and corresponding presence in the training buffer of a segment of the channel-distorted sample stream representing at least the predetermined training sequence of digital symbols;

computing, responsive to the trigger signal, an updated set of compensation filter coefficients based on correlating the at least a portion of the channel-distorted sample stream to the predetermined training sequence;

generating, simultaneously with the buffering, an undistorted sample stream by filtering the channel-distorted sample stream based on the updated set of compensation filter coefficients previously computed to at least partially compensate for the satellite channel filter distortions of the satellite channel; and outputting the undistorted sample stream to a demodulator path.

14. The method of claim 13, further comprising:

receiving a satellite channel assignment message indicating assignment of the satellite demodulator to a particular satellite channel of a plurality of satellite channels of a satellite, each satellite channel having a respective one or more channel filters producing respective satellite channel filter distortions associated with the satellite channel;

selecting, based on the satellite channel assignment message, a selected set of compensation filter coefficients of a plurality of sets of compensation filter coefficients as stored in association with the particular satellite channel, each set of compensation filter coefficients previously computed to at least partially compensate for the respective satellite channel filter distortions of a respective one of the plurality of satellite channels and stored in a coefficient data store in association with a respective channel identifier of the respective one of the plurality of satellite channels; and setting a plurality of filter taps of a pre-equalizer filter block, such that the generating the undistorted sample stream is by filtering the channel-distorted sample stream based on the selected set of compensation filter coefficients.

15. The method of claim 13, wherein:
the at least one pre-equalizer frame is formatted as a digital video by satellite downlink frame with a start of frame (SOF) sequence, the pre-equalizer frame code formatted as a physical layer signaling code, and the training sequence of digital symbols encoded as payload data; and
the correlating is based on the SOF sequence.

\* \* \* \* \*